Figure 1A:
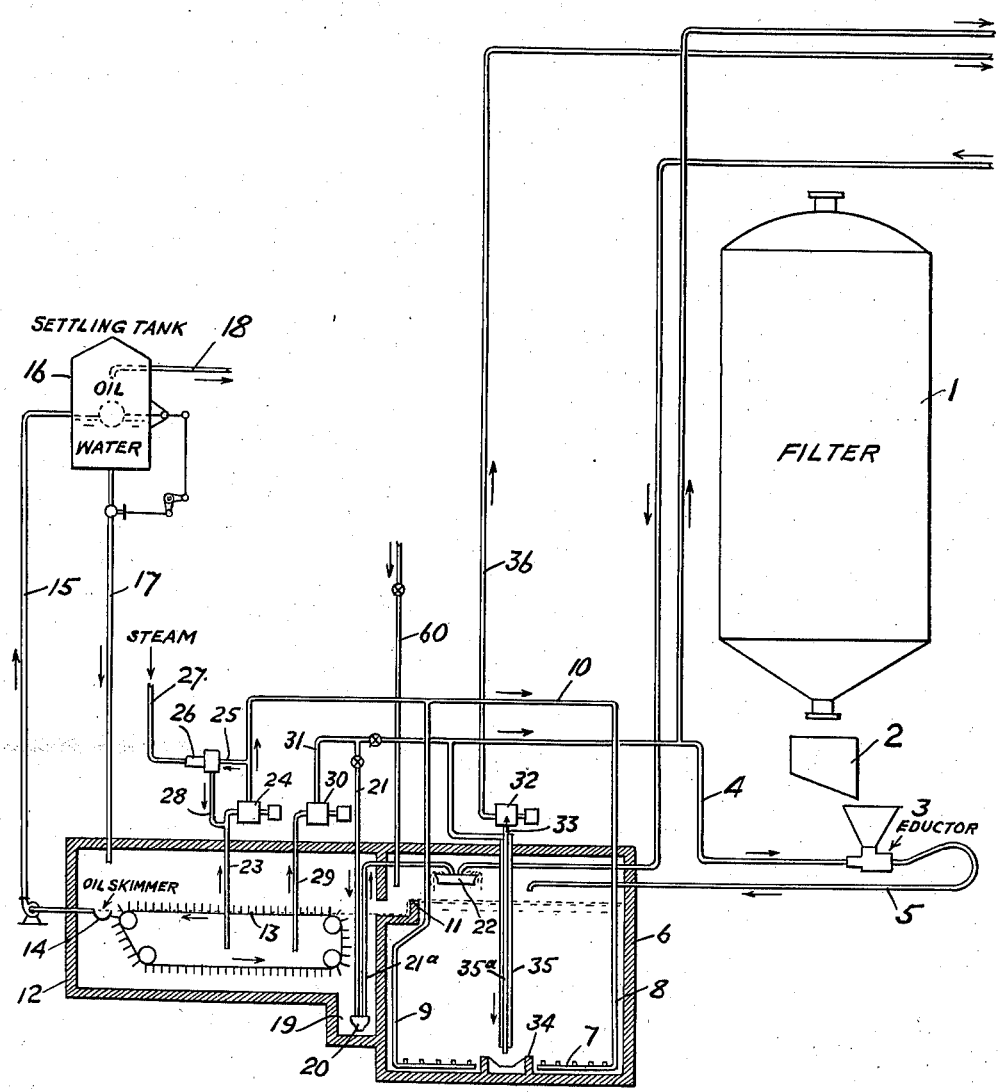

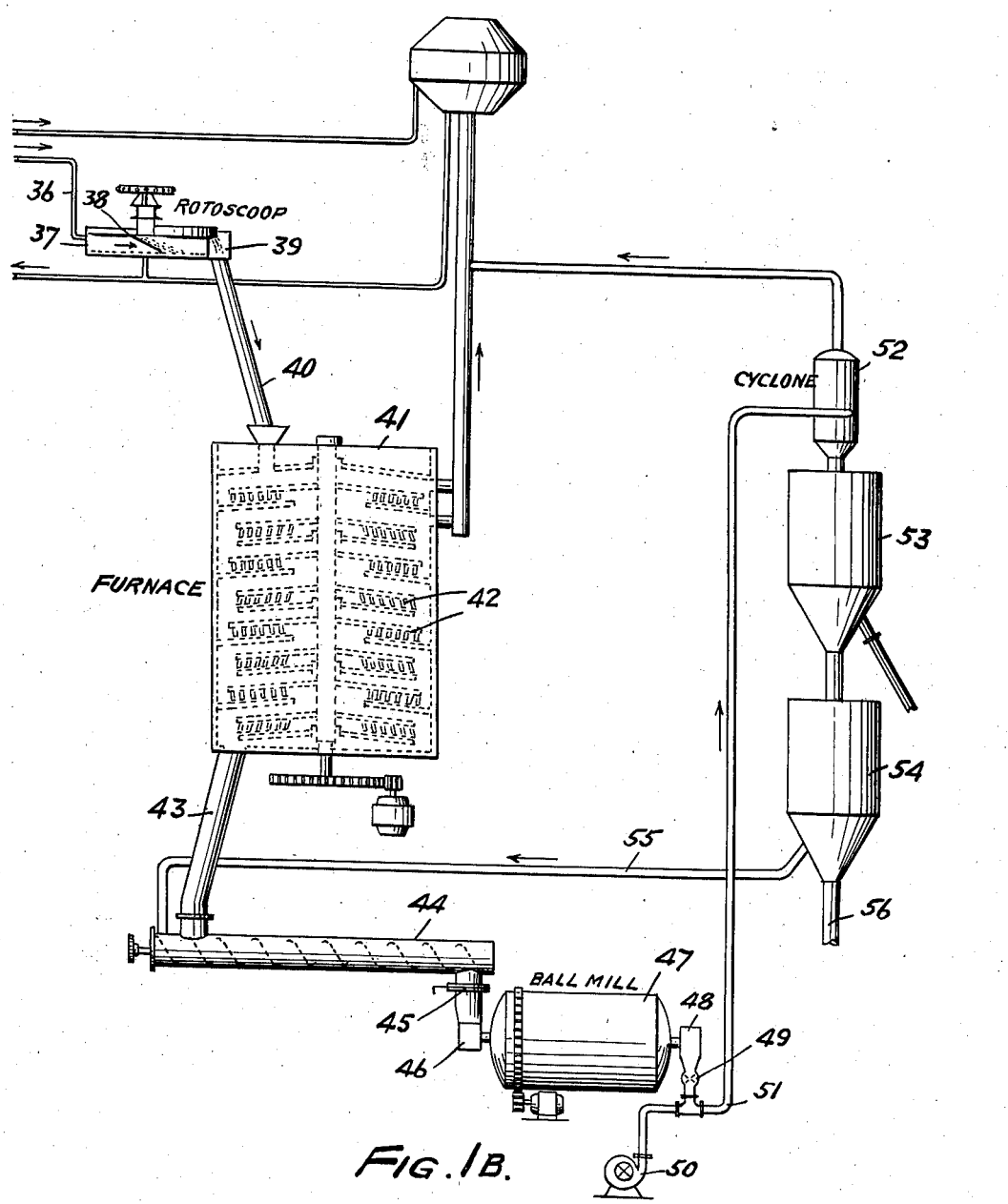

Patented Oct. 7, 1941

2,258,438

UNITED STATES PATENT OFFICE 2,258,438

METHOD FOR THE MANUFACTURE OF BLACK PIGMENT

Paul D. Barton, Chester County, Pa., assignor to Sun Oil Company, Philadelphia, Pa., a corporation of New Jersey Original application March 29, 1938, Serial No. 198,794. Divided and this application July 7, 1938, Serial No. 217,888

6 Claims. (Cl. 106—307)

The present invention relates to a process of treating spent filter clay, which has been used to purify lubricating oil, in order to recover a substantial amount of oil from the clay to manufacture a black pigment therefrom.

In the final purification of lubricating oils, the oil is either filtered through fuller's earth, bentonite, or other porous adsorptive contact material, or it is mixed and agitated with some contact material, in order to de-colorize the oil and, in cases where the oil has been acid treated and has not been subsequently subjected to a caustic wash, to neutralize the oils.

It has heretofore been suggested that the spent clay from such filtering operations be heated in order that the oil therein may be broken down into carbon which colors the clay black and renders it fit for use as a black pigment. However, the clay obtained from such filtering operations generally contains too high a percentage of oil to be entirely suitable for use in the production of black pigments. It is, therefore, necessary that the clay be given a preliminary treatment in order to render it fit for such use.

It is, therefore, an object of the present invention to treat contact materials of the clay type which have been used either as percolation or contact filtration purifying agents for lubricating oils to recover therefrom lubricating oil which has been adsorbed by the clay and to convert the clay into a marketable product.

Other and further objects of the invention will appear as the description progresses.

I will now briefly describe what I consider the best mode of practicing my invention. The clay is mixed with hot water and passed to a leaching pit which has been previously filled with hot water having a pH value greater than 7. As soon as the pit is filled, the hot water is passed up through the clay, additional hot water continuously flowing into the pit at a multiplicity of places over the floor of the pit so as to cause a steady upflow of water through the clay at all portions of the pit. The hot water passing through the clay bed leaches oil from the clay and this mixture of oil and water, together with some fines, overflows into a separator pit having mechanical provisions for skimming the oil from the surface of the separator pit and for carrying it off, in admixture with some water, to a final oil settling tank. Some of the fines which pass over with the oil and water to the separator pit settle and are returned to the primary leaching pit by means of an eductor and are evenly distributed over the clay and water in the leaching pit so as not to cause an agitation of the clay which would break up the bead. The excess water from the separator pit is removed, heated, and passed back to the bottom of the clay leaching pit, or is used as a medium for conveying further clay to the leaching pit from the filter. After the desired amount of oil has been removed from the clay by the water in the leaching pit, the clay is passed to a suitable separator for removing the major portion of the water from the clay which is then passed to a furnace where it is burned in a reducing atmosphere, causing the oil admixed therewith to be reduced to carbon.

A furnace of the rotary hearth type, such as a Nichols-Herreshoff, is used to burn the clay. In the first one or two hearths any water left with the clay will be evaporated and will cause further oil to be steam distilled from the clay. The oil so vaporized passes off with the flue gas from the furnace which is passed to a flue gas washer where the oil is condensed and returned to the leaching pit with any fines which may be carried off by the flue gas.

From the furnace the burned clay, which consists of a mixture of carbon and clay and is suitable for production of black pigments, is passed to a cooler and conveyor from whence it is passed to a ball mill wherein it is finely ground. From the ball mill the ground clay with its contained carbon is blown to a cyclone separator wherein the air used to convey the ground clay is separated from the clay. From the cyclone separator the ground clay or pigment is passed to a classifier of the centrifugal type, wherein any unground abrasive material present in the ground clay is removed. From this classifier the clay is passed to a second classifier, usually of the centrifugal type, wherein clay having the proper fineness for use as pigment is separated from that which is too coarse for use as pigment. The coarse material is returned to the ball mill for re-grinding, and the finished pigment is passed to packing equipment.

A better understanding of the invention will be had by reference to the accompanying drawings, which are a diagrammatic representation of one form of apparatus in which the present invention may be carried out.

I represents a filter which may be either of the percolation or contact type. 2 is a hopper into which the clay may be dumped, for feeding into an eductor 3 to which hot water heated to a temperature of say 120–200° F. is fed through line 4. Within the eductor the water from line 4 mixes with the clay and the mixture in the form of a slurry passes through line 5 to a clay leaching pit 6, the pit 6 having previously been filled with hot water of about the same temperature as that mixed with the clay in the eductor 4. The floor of the pit 6 is covered with a system of perforated pipes 7 which are fed with hot water through lines 8 and 9 from pipe 10. The water admitted from the pipes 7 passes upwardly through the clay in the pit 6 carrying with it oil from the clay and also a small amount of fines present in the clay. This admixture of water, oil and fines overflows the weir 11 and passes into the oil separator pit 12.

The oil separator pit 12 is provided with suitable means such as a continuously revolving belt 13 having raised or ribbed portions or flights thereon, for carrying the oil separating from the water and fines in pit 12 over to an oil skimmer or trough 14, from whence it is passed through line 15 to a final separating tank 16. Water is drawn from the bottom of the separator or settling tank 16 through line 17, and is returned to the system. Oil which is separated in tank 16 is withdrawn through a line 18.

The fines which settle by gravity in the pit 12 are accumulated by the flights on 13 into sump 19 from which they are picked up by means of an eductor 20 to which water from line 21 is fed. The admixtures of fines and water is passed through line 21a to the weir box 22 from which it overflows into the clay leaching pit. The separated water from pit 12 is withdrawn through line 23 by means of circulating pump 24 which forces it into line 10. A portion of this water may be by-passed through line 25 to heater 26, wherein it is heated by steam admitted through line 27. This heated water is then returned to the circulating pump through line 28. A further water outlet line 29 is provided in separator pit 12. This water is withdrawn by means of pump 30 and is passed to line 31.

After the clay in the pit 6 has been leached to the degree required, it is removed from the pit by mud pump 32, taking suction on the bottom of the pit, through line 33. Placed within the bottom of the pit 6 is a restricted trough, shaped sump 34 into which water is forced through jet pipes 35 and 35a which parallel pipe 33. The water so admitted serves to mix as much water as desired with the clay and water mixture withdrawn by means of mud pump 32. It is evident that if mud pump 32 is operated at a constant speed, the more water which is added through lines 35 and 35a, the less clay will be picked up with the water passing up through line 33 to the mud pump 32. The mixture of leached clay and water passing from the mud pump is forced through line 36 to a separating device 37, wherein substantially all excess water is separated from the clay. This separator 37 may be of the type utilizing radial plows or scrapers 38 which serve to raise the clay from the bottom of the separator, de-water it by the compression caused in plowing it up, and then, by means of a vane, force it out on the peripheral ledge 39, from which it falls down chute 40 to the furnace.

The furnace 41 may be of the Nichols-Herreshoff multiple hearth type having a series of central and annular hearths set one above the other so that the clay is caused by means of rabble arms 42 to pass downwardly from one hearth to the other. Heat is supplied by burners placed between the hearths, and additional air may be admitted from the central shaft which is hollow. By this means the atmosphere in the furnace may be so controlled as to be either a reducing or an oxidizing atmosphere. The bottom hearth of the furnace is air cooled so that the clay is partially cooled before it leaves the furnace.

From the furnace the clay passes through a chute 43 to a screw conveyor and cooler 44. This conveyor and cooler is of the ordinary screw conveyor type, but is furnished with a jacket through which cold air may be blown or through which cooling water may be circulated. From the conveyor the clay enters a chute 45 which communicates with the hopper 46. The clay enters the ball mill 47 and in the course of grinding moves to the opposite or exit end. The outlet end of the ball mill 47 has a receiving hopper 48, the outlet from which is controlled by a star valve 49. A blower 50 communicating with a pipe 51 furnishes air for conveying the ground material from the ball mill to a cyclone separator 52, within which the ground pigment is separated from the air used to convey it. The separated pigment falls from the cyclone separator 52 into a classifier 53.

Filter clays generally contain a certain amount of silica which is non-porous in nature, and which when burned becomes hard and abrasive. It is practically impossible to grind this material, and it therefore passes substantially unchanged from the ball mill. The classifier 53 serves to separate this abrasive material from the balance of the pigment. The classifier 53 may be of the centrifugal type in which an air stream floats the lighter material depositing it in the outside of the casing, while the heavier material drops through to a second classifier 54 of the same type. Classifier 54 serves to separate that material which is too coarse to be used as pigment, and returns it to the conveyor 44 through line 55. This material which is too coarse for use as pigment is then passed through the conveyor 44 back to the ball mill 47. This material is not as abrasive as that which was removed in the classifier 53, but is merely insufficiently ground clay. From the classifier 54 the finished pigment is withdrawn through pipe 56 to packing equipment.

Strict conditions for the operation of the present process cannot be set forth, due to the differences in filter media and in the oil treated. However, the following will serve as an example:

The clay is mixed with water having a temperature of from 120–200° F. in the eductor 3, and is passed to the leaching pit 6, which has been previously filled with water at about the same temperature. The clay settles to the bottom of the pit and when a sufficient charge has been placed therein, heated water is admitted to the perforated pipes 7. This water is also from 120–200° F. and has a pH value of about 8, since it has been discovered that if the water is neutral or on the acid side it will not properly leach the clay, as the clay is somewhat acid due to the presence of sulphur compounds in the oil. The alkalinity is obtained by the addition of sodium hydroxide or other alkaline material to the water through valved line 60. By regulating the temperature and pH value of the water the amount of oil which will be leached from the clay can be controlled within desired limits, an increase in either or both the temperature or alkalinity of the water serving to increase the amount of oil which will be leached from the clay. As a general rule the temperature chosen for the water will be that temperature at which the oil being filtered is passed through the filter, thus when the clay which is being processed in accordance with the present invention is obtained from a filter which has been handling a light oil, which flows freely at a low temperature, the oil will be at a relatively low temperature and therefore the water used may be at a correspondingly low temperature, while if the clay is obtained from a filter which has been handling a heavy oil, which was heated to a relatively high degree in order to make it flow freely through the filter, the water used for leaching will preferably be heated to a correspondingly high degree. The viscosity of the oil in the clay and also the time that the clay remains in the leaching pit 6 also affect the amount of oil which will be leached from the clay. Thus, due to the number of variables in the process it is impossible to give exact optimum operating conditions; however, the optimum conditions can readily be determined for any particular raw material and product.

The water introduced into the bottom of pit 6 through perforated pipes 7, percolates up through the clay evenly, and without channeling, carrying with it the oil which it removes from the clay during its passage. A certain amount of clay fines are also carried upward by the water and oil and the mixture overflows the weir 11 into the pit 12. Due to the practically quiescent state of the oil and water in pit 12, the oil separates and remains on top and is carried along by the belt 13 to the oil skimmer 14. Since the oil on top is necessarily in a rather thin layer, some water is removed by the oil skimmer 14. From the skimmer 14 the oil and water mixture is passed to a settling tank 16 wherein the oil separates forming a top layer, and the water settles forming a bottom layer. A float placed at the interface of the oil and water layers operates a valve in the water outlet line 17. From time to time oil is drawn off through the line 18. Any clay fines which are carried out into the pit 12 settle into the sump 19 and are removed by the eductor 20 and returned to clay pit 6 where they are evenly distributed by means of a weir box 22 so as not to agitate the clay in the pit 6. The pump 24 serves to withdraw superfluous water from the pit 12 and to pass a portion of it to the heater 26 and to the lines 8 and 9 feeding the perforated pipes 7 on the floor of pit 6. The pump 30 serves to furnish water for the two eductors 20 and 3, as well as to force water down through the pipe 35 in pit 6 to control the amount of clay removed by the mud pump 32. When all the desired or available oil is removed from the clay in the leaching pit 6, the clay is pumped as heretofore explained to the separator 37. The amount of oil removed from the clay varies with the viscosity and other characteristics of the oil adsorbed by the clay, and also with the use to which the clay is to be put after further treatment.

A considerable percentage of oil is allowed to remain in the clay so that when burned in a reducing atmosphere in the furnace 42 the clay will contain a considerable amount of carbon. The temperature during the time that the clay is in the furnace should not rise above 600° F. so that considerable carbon in a finely divided state is admixed with the clay.

On grinding in the ball mill 47 a finely divided homogeneous black pigment is formed. There will be present in the pigment, however, about 5% of hard abrasive material which is of greater specific gravity and of larger particle size than the pigment. It must be removed therefore in order to form a commercial pigment. There is also present about 35% of pigment which is not ground to a fine enough degree. The abrasive material is therefore separated in the first classifier 53 and the insufficiently ground pigment is separated in the second separator 54, so that the remaining 60% of the clay passes out through pipe 56 as extremely fine black pigment capable of passing through a 325 mesh sieve or bolter. This pigment may be utilized for any purposes such as paint compositions, plastic compositions, blacking, et cetera.

I do not herein claim broadly the method disclosed above of controlling the amount of oil which is permitted to remain in the clay since this method is claimed in my copending application Serial No. 198,794, filed March 29, 1938, of which this application is a division. The present case relates to the use of my method of regulating the amount of oil in the clay to render spent filtering clay suitable for the manufacture of a black pigment and the subsequent treatment of the clay having a regulated quantity of oil therein to produce such a black pigment. Nor do I claim herein any method involving burning of clay, from which oil has been removed by my herein described leaching process, in an oxidizing atmosphere to revivify the clay, since such subject matter is claimed in my copending application, Serial No. 217,889 filed July 7, 1938, now Patent No. 2,200,145, which is likewise a division of my above mentioned application, Serial No. 198,794, filed March 29, 1938.

What I claim and desire to protect by Letters Patent is as follows:

1. In a method of producing a black pigment by burning in a reducing atmosphere clay containing adsorbed oil, an improvement which comprises introducing clay containing an amount of oil in excess of that desired in the clay to be burned into a zone of leaching and agitation, therein passing through the clay water having such a pH value greater than 7 and at such temperature as to remove from the clay such portion of the oil as will leave in the clay an amount of oil slightly in excess of that desired in the clay to be burned, removing the clay from said zone of leaching and agitation and mechanically separating the greater portion of water therefrom, drying the thus largely dewatered clay by passing a hot gas thereover to vaporize the water with resultant steam distillation of the excess oil, and then burning the dried clay in a reducing atmosphere and utilizing the hot products of combustion from the burning step as the hot gas in the drying step specified.

2. A method of treating used filter clay containing adsorbed oil in order to recover oil therefrom and produce a black pigment from the clay which comprises introducing the oil bearing clay into a zone of leaching and agitation and therein passing water having a pH value greater than 7 through the clay to agitate the same and at such pH value and temperature as to leach therefrom a predetermined percentage of oil, removing water containing leached out oil and clay fines from said zone of leaching and agitation and introducing the same to a settling zone, therein separating oil from said water and clay fines, removing said clay fines from the settling zone and removing clay from the zone of leaching and agitation and mechanically separating from such removed clay and clay fines the greater portion of water, drying the largely dewatered clay by passing a heated gas thereover to vaporize water and steam distill a portion of the oil remaining therein, burning the dried clay in a reducing atmosphere and utilizing the products of combustion from said burning step as the hot gas in the drying step specified.

3. In a method of producing a black pigment by burning in a reducing atmosphere clay containing adsorbed oil, an improvement which comprises introducing clay containing an amount of oil in excess of that desired in the clay to be burned into a zone of leaching and agitation, therein passing through the clay water having such a pH value greater than 7 and at such temperature as to remove from the clay such portion of the oil as will leave in the clay an amount of oil slightly in excess of that desired in the clay to be burned, removing the clay from said zone of leaching and agitation and mechanically separating the greater portion of water therefrom, and passing the thus largely dewatered clay through a heating zone in which any water left in the clay will be evaporated with resultant steam distillation of the remaining excess oil and in which the dried clay is then burned in a reducing atmosphere and the hot products of combustion from the burning step specified utilized in the drying step.

4. A method of treating used filter clay containing adsorbed oil in order to recover oil therefrom and produce a black pigment from the clay which comprises introducing the oil bearing clay into a zone of leaching and agitation and therein passing water having a pH value greater than 7 through the clay to agitate the same and at such pH value and temperature as to leach therefrom a predetermined percentage of oil, removing water containing leached out oil and clay fines from said zone of leaching and agitation and introducing the same to a settling zone, therein separating oil from said water and clay fines, removing said clay fines from the settling zone and removing the clay from the zone of leaching and agitation and mechanically separating from such removed clay and clay fines the greater portion of water, passing the thus largely dewatered clay through a heating zone in which any water left in the clay will be evaporated with resultant steam distillation of the remaining excess oil and in which the dried clay is then burned in a reducing atmosphere and the hot products of combustion from the burning step specified utilized in the drying step.

5. In a method of producing a black pigment by burning in a reducing atmosphere clay containing adsorbed oil, an improvement which comprises introducing clay containing an amount of oil in excess of that desired in the clay to be burned into a zone of leaching and agitation, therein passing through the clay water having such a pH value greater than 7 and at such temperature as to remove from the clay such portion of the oil as will leave in the clay an amount of oil slightly in excess of that desired in the clay to be burned, removing the clay from said zone of leaching and agitation and mechanically separating the greater portion of water therefrom, and passing the thus largely dewatered clay through a heating zone in which any water left in the clay will be evaporated with resultant steam distillation of the remaining excess oil and in which the dried clay is then burned in a reducing atmosphere.

6. A method of treating used filter clay containing adsorbed oil in order to recover oil therefrom and produce a black pigment from the clay which comprises introducing the oil bearing clay into a zone of leaching and agitation and therein passing water having a pH value greater than 7 through the clay to agitate the same and at such pH value and temperature as to leach therefrom a predetermined percentage of oil, removing water containing leached out oil and clay fines from said zone of leaching and agitation and introducing the same to a settling zone, therein separating oil from said water and clay fines, removing said clay fines from the settling zone and removing clay from the zone of leaching and agitation and mechanically separating from such removed clay and clay fines the greater portion of water, and passing the thus largely dewatered clay through a heating zone in which any water left in the clay will be evaporated with resultant steam distillation of the remaining excess oil and in which the dried clay is then burned in a reducing atmosphere.

PAUL D. BARTON.